United States Patent
Hinton et al.

(10) Patent No.: US 12,435,465 B2
(45) Date of Patent: Oct. 7, 2025

(54) HIGH THROUGHPUT CARBON FIBER SURFACE MODIFICATION

(71) Applicant: DREXEL UNIVERSITY, Philadelphia, PA (US)

(72) Inventors: Zachary R. Hinton, Philadelphia, PA (US); Nicolas Javier Alvarez, Drexel Hill, PA (US); Giuseppe Raffaello Palmese, Hainesport, NJ (US)

(73) Assignee: DREXEL UNIVERSITY, Philadelphia, PA (US)

( * ) Notice: Subject to any disclaimer, the term of this patent is extended or adjusted under 35 U.S.C. 154(b) by 962 days.

(21) Appl. No.: 17/429,860

(22) PCT Filed: Feb. 11, 2020

(86) PCT No.: PCT/US2020/017652
§ 371 (c)(1),
(2) Date: Aug. 10, 2021

(87) PCT Pub. No.: WO2020/167760
PCT Pub. Date: Aug. 20, 2020

(65) Prior Publication Data
US 2022/0205166 A1    Jun. 30, 2022

Related U.S. Application Data (60) Provisional application No. 62/804,531, filed on Feb. 12, 2019.

(51) Int. Cl.
| D06M 23/06 | (2006.01) |
| D06M 15/643 | (2006.01) |
| D06M 101/40 | (2006.01) |

(52) U.S. Cl.
CPC .......... D06M 15/643 (2013.01); D06M 23/06 (2013.01); D06M 2101/40 (2013.01)

(58) Field of Classification Search
CPC . D06M 15/643; D06M 23/06; D06M 2101/40
See application file for complete search history.

(56) References Cited

U.S. PATENT DOCUMENTS

| 3,956,179 A | 5/1976 | Sebastian et al. |
| 3,972,984 A | 8/1976 | Izuka et al. |
| 5,876,753 A | 3/1999 | Timmons et al. |
| 6,974,762 B2 | 12/2005 | Gracias et al. |
| 7,731,928 B2 | 6/2010 | Duesberg et al. |
| 8,237,318 B2 * | 8/2012 | Ikitake ................. H02K 11/215 310/68 B |
| 8,309,644 B1 * | 11/2012 | Huang ..................... C08J 5/248 524/495 |
| 9,149,793 B2 | 10/2015 | Thompson et al. |
| 2007/0248523 A1 | 10/2007 | Duesberg et al. |
| 2008/0261116 A1 * | 10/2008 | Burton .................... C23C 16/24 427/113 |
| 2009/0007818 A1 | 1/2009 | Militz et al. |
| 2017/0267532 A1 | 9/2017 | Liu |

FOREIGN PATENT DOCUMENTS

| KR | 10-2014-0021116 | * | 2/2014 |
| KR | 10-2014-0021116 A | | 2/2014 |
| KR | 10-1856978 B1 | | 5/2018 |

OTHER PUBLICATIONS

International Search Report and Written Opinion for corresponding International application No. PCT/US2020/017652; dated Jun. 4, 2020 (10 pages).
Anderson, Aaron S., et al. "Functional PEG-Modified Thin Films for Biological Detection." Langmuir 24.5 (2008): 2240-2247.
Hinton, Zachary et al. "High Throughput Carbon Fiber Surface Modification." SAMPE 2019 Conference Proceedings, Charlotte N.C., USA (2019): 1-9.
Lyubchencko, Yuri L., et al. "Atomic Force Microscopy Imaging of Double Sranded DNA and RNA." Journal of Biomolecular Structure and Dynamics 10.3 (1992): 589-606.
Xu, Yunsheng, et al. "Silane-treated carbon fiber for reinforcing cement." Carbon 39.13 (2001): 1995-2001.
Zhang, Feng, et al. "Chemical Vapor Deposition of Three Aminosilanes on Silicon Dioxide: Surface Characterization, Stability, Effects of Silane Concentration, and Cyanine Dye Adsorption." Langmuir 26.18 (2010): 14648-14654.
Plueddemann, Edwin P. "Silane Coupling Agents." Second Edition, Plenum Press, New York (1991): 1-253.

* cited by examiner

*Primary Examiner* — Amina S Khan
(74) *Attorney, Agent, or Firm* — Mendelsohn Dunleavy, P.C.; Kevin J. Dunleavy (57) ABSTRACT

Typical commercial surface treatments for continuous carbon fibers are often unavailable for discontinuous fibers. As such, there is little variety of chopped fiber surfaces leading to non-ideal coating solutions which result in poor interfacial compatibility between fibers and a composite matrix. A method of applying a highly effective coating using a high throughput technique for chopped carbon fibers. The method provides the ability to tune both the coating thickness and chemical functionality using processing parameters. The coatings are evaluated using X-ray photoelectron spectroscopy (XPS) for uniformity and composition. Using this technique, thermoplastic composites are highlighted showing an increase in interfacial shear strength (IFSS) of 25 MPa. This process shows promise for increasing the throughput of surface treatment of chopped fiber on the industrial scale.

15 Claims, 10 Drawing Sheets

Figure 1

| Label | Description |
|---|---|
| A | Vacuum Chamber |
| B | Vent Valve |
| C | Pressure Measurement |
| D | Vacuum Valve |
| E | Vacuum Pump |
| F | Carbon Fiber |
| G | Mesh Support |
| H | Liquid Coupling Agent |

HIGH THROUGHPUT CARBON FIBER SURFACE MODIFICATION

CROSS REFERENCE TO RELATED APPLICATIONS

This application claims the benefit of U.S. Provisional Application No. 62/804,531, filed on Feb. 12, 2019, the entire disclosure of which is hereby incorporated by reference as if set forth fully herein.

STATEMENT OF GOVERNMENT INTEREST

This invention was made with government support under Cooperative Agreement Number HR0011-16-2-0014 awarded by the Defense Advanced Research Projects Agency. The Government has certain rights in the invention.

BACKGROUND

Short (chopped) carbon fibers are a versatile filler used for a variety of high performance polymer composites [1][2]. Utilizing short carbon fibers is beneficial for manufacturing thermoplastic composites as well as various composites of complex geometries (discrete composites). While manufacture of continuous carbon fiber tows and fabrics allows for unique processing opportunities for modifying the fiber surface continuously, chopped fibers are more difficult to process using conventional techniques. There is a need to process chopped fibers using scalable methods to apply desired treatments to industrial scale quantities of chopped fibers leading to more variety of high performance feedstock materials for the composite industry.

Surface modification is one approach to creating novel carbon fiber materials with tunable properties. One typical motivation for altering the fiber surface is to increase the performance of composites by improving the adhesion of matrix material to the filler. Many approaches have been used to modify the chemical and physical structure of the surface [3], however a balance between the morphology and surface chemistry is required to achieve superior performance. Another motivation for modifying the surface chemistry is to enhance the functionality of carbon fibers making them more useful for a variety of novel processes. For example, adding reactive moieties to the surface make carbon fibers available for chemical reaction processes, bringing carbon fiber strength and weight properties to traditional applications where they would not be used before. Furthermore, some manufacturing processes such as dispersion and flow of carbon fiber suspensions require a specific surface condition in order to increase processability, stability, and dispersibility.

Figure 1:
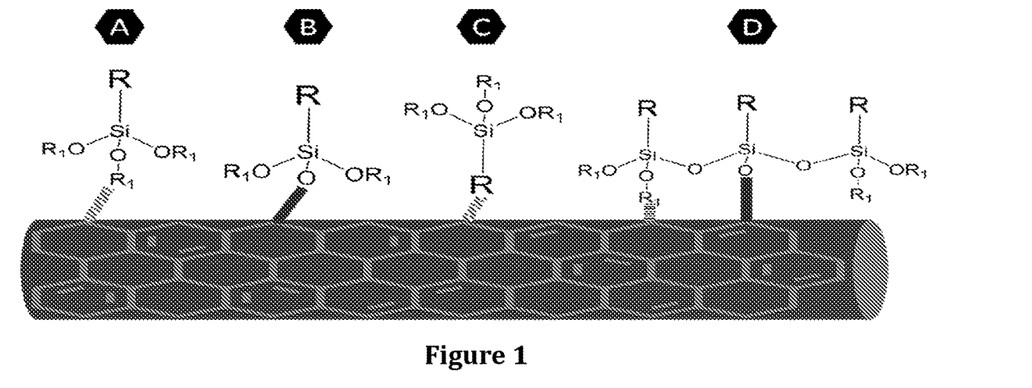
FIG. 1 shows an illustration of typical species of silane on the surface of carbon.
Figure 2:
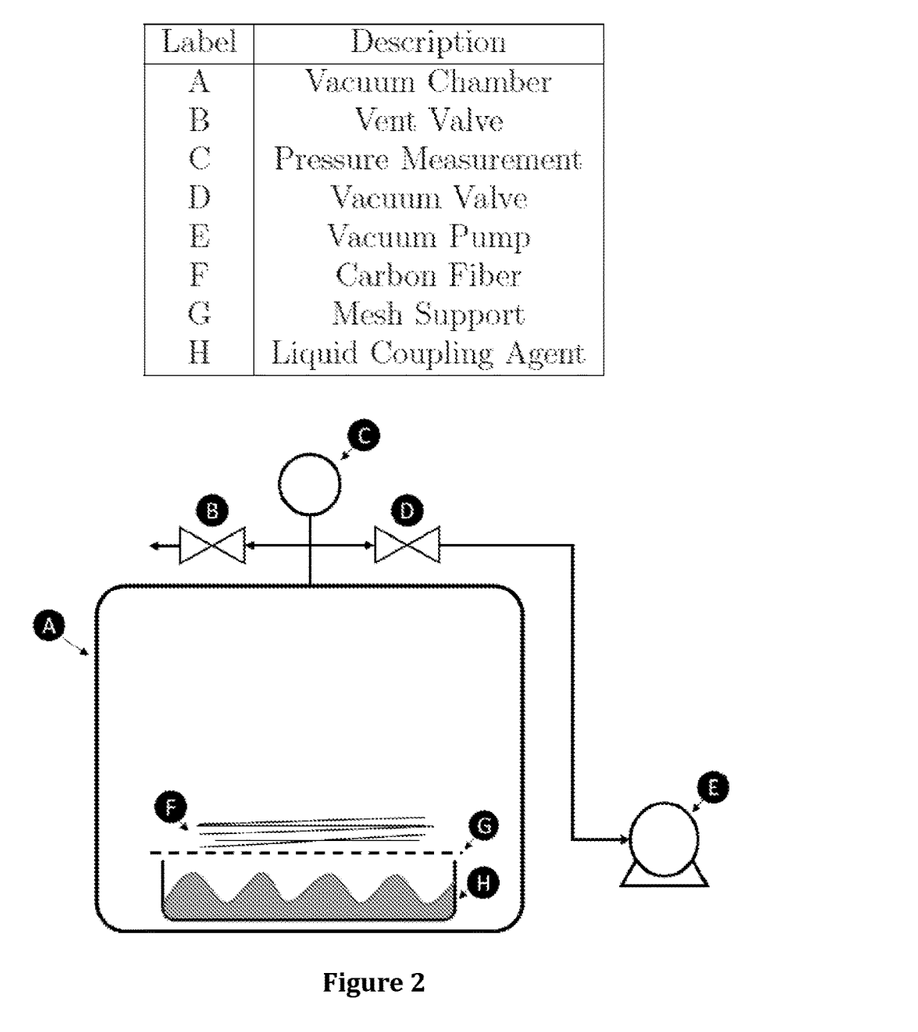
FIG. 2 is a diagram of the present invention with a corresponding legend.

A method for modifying surfaces chemically is applying silane molecules, preferably functional organosilane molecules. These molecules typically consist of a central silicon atom bonded to three identical short functional groups by ether linkages and a single longer organic functional group. These molecules are preferred because of their ease of attachment to solid, inorganic substrates and the wide variety of chemical functionalities available commercially. Silane molecules attach to the inorganic substrates in a variety of complex orientations. FIG. 1 illustrates a few of the most typical theoretical orientations possible for silane molecules at the solid surface. Here R represents the functional moiety and $R_1$ represents either the native short functional groups or some derivative of that group. Silanes are often thought to undergo hydrolysis at the ether linkage creating an $O^-$ functional group, however other chemistries are possible and therefore the chemical interactions depicted vary. Additionally, the substrate surface often contains interacting functionalities, either natively or through chemical modification, improving silane interactions.

Scenario A in FIG. 1 depicts a silane molecule which is physically adsorbed to the fiber surface through interactions between the short group and the fiber surface. These interactions are weak and reversible. Likewise, scenario C depicts physical interactions, however these occur between the main functional group R and the fiber surface. While the molecule is shown normal to the fiber surface, all interactions can induce a variety of physical orientations. Scenario B shows the classical chemical bond between the silane and the surface. This is known to occur between hydroxyl surface moieties on the fiber surface and the $O^-$ of the hydrolysed silane through chemical reaction [4]. For some chemistries, this reaction may be possible between the surface and the R group, however not generally. The last scenario D shows the crosslinked silane, i.e. at least one silane which has been attached to the surface via one of the previous mechanisms followed by chemical reaction between two of the short moieties creating a continuous network of silane molecules on the surface. All of these reactions occur at various conditions and processing giving a variety of functional silane surfaces, however, the ideal case for most applications is a monolayer because its functionality is optimal and no (inferior) macroscale properties of the silane are achieved.

Typical application of silanes to inorganic surfaces is done using solution based formulations, wherein a good solvent is used and pH modified such that hydrolysis is catalyzed. The substrate is immersed and removed such that a thin layer of bound silane layer is achieved. This method has been used for most applications with many modifications. For short carbon fibers, these methods have been applied directly [5][6], however controlling the silane layer is difficult and techniques are often chemistry specific. Vapor phase silanization has been previously developed where silane solutions are evaporated to form silane layers on the substrate surface giving rise to controllable monolayers of silanes on inorganic substrates [7].

The present invention relates to a vapor phase silanization technique wherein a highly tunable functional surface is achieved on chopped carbon fibers. To demonstrate this technique an example silane was deposited on the surface of a model carbon fiber. Spectroscopy was used to confirm the silane layer and show a favorable increase in the surface properties. With this method it has been shown that highly tailored carbon fiber surfaces are achievable by high throughput processing leading to future superior composite materials and expanding the possibilities for utilizing carbon fibers in a variety of chemical processes.

SUMMARY OF THE INVENTION

1. In a first aspect, the present invention relates to a method of modifying a surface of carbon fiber having a functional moiety. The method includes step a) a step of contacting, in the absence of a solvent, the surface of the carbon fiber with a vapor phase of a silane capable of covalent bonding to the functional moiety on the surface of the carbon fiber or depositing via condensation on the surface of the carbon fiber; wherein said contacting step is conducted in a sealed container a vacuum pressure ranging from the vapor pressure of the silane to up to about 101,325 Pa for a sufficient time to covalently bond at least some of said silane to the functional moiety on the surface of the carbon fiber. Step b) of the method requires exposing the carbon fiber produced in step a) to a temperature of from about 25° C. to about 200° C. for a period of from about 1 minute to about 96 hours to crosslink at least some of the silane on the surface of the carbon fiber.

2. In the method according to sentence 1, the functional moiety on the surface of the carbon fiber may include one or more hydroxyl groups, one or more carboxyl groups, a combination of or both hydroxyl groups and carboxyl groups or a combination of hydroxyl groups, carboxyl groups and amine groups.

3. In the method according to sentence 2, the functional moiety on the surface of the carbon fiber may include hydroxyl groups.

4. In the method according to sentence 1, the functional moiety on the surface of the carbon fiber may be formed by oxidizing a surface of carbon fiber.

5. In the method according to sentence 1, the functional moiety on the surface of the carbon fiber may be formed by one or more of the following methods, ozone treatment, plasma, acidic treatment, hydride chemistry, basic treatment, thermal oxidation, and gamma radiation/laser.

6. In the method according to any one of sentences 1-5, the carbon fiber may not be continuous and may have a length and diameter sufficient to be processed in a batch process.

7. In the method according to any one of sentences 1-6, wherein the carbon fiber has an average length of from about 1 mm to about 100 mm and an average fiber diameter of from about 1 μm to about 100 μm.

8. In the method according to any one of sentences 1-7, the carbon fiber may be chopped carbon fiber.

9. In the method according to any one of sentences 1-8, the silane may be an organosilane.

10. In the method according to any one of sentences 1-8, the silane may be a functionalized organosilane.

11. In the method according to any one of sentences 1-8, the silane may be selected from the group consisting of, acrylate and methacrylate functional silanes, aldehyde functional silanes, amino functional silanes, anhydride functional silanes, azide functional silanes, carboxylate functional silanes, phosphonate functional silanes, sulfonate functional silanes, epoxy functional silanes, ester functional silanes, halogen functional silanes, hydroxyl functional silanes, isocyanate and masked isocyanate functional silanes, phosphine and phosphate functional silanes, sulfur functional silanes, vinyl and olefin functional silanes, multi-functional and polymeric silanes, UV active and fluorescent silanes, chiral silanes, biomolecular probes, trihydrosilanes, dipodal silyl hydrides, and dipodal silanes.

12. In the method according to any one of sentences 1-8, the silane may be selected from the group consisting of, (3-aminopropyl) trimethoxysilane, (3-aminopropyl) triethoxysilane, (3-acryloxypropyl) trimethoxysilane, (3-triethoxysilyl) propyl succinic anhydride, and ((chloromethyl) phenylethyl) trimethoxy silane.

13. In the method according to any one of sentences 1-12, the surface modification of the surface of the carbon fiber may be controlled by controlling at least two of the following parameters, process temperature, vacuum pressure, humidity, exposure time, fiber/reactor volume ratio, pH, and crosslinking temperature.

14. In the method according to any one of sentences 1-13, the vacuum pressure may be from about $10^{-3}$ mmHg to about 200 mmHg.

15. In the method according to any one of sentences 1-13, the vacuum pressure may be from about $10^{-3}$ mmHg to about 50 mmHg.

16. In the method according to any one of sentences 1-15, the contacting step may be carried out at a temperature of from about 0° C. to about 200° C.

17. In the method according to any one of sentences 1-16, the contacting step may be carried out at a temperature of from about 25° C. to about 50° C.

18. In the method according to any one of sentences 1-17, the contacting step may be carried out at a relative humidity of from about 0% to about 100% or from about 0% to about 80%.

19. In the method according to any one of sentences 1-18, the contacting step may be carried out at a relative humidity of from about 0% to about 10%.

20. In the method according to any one of sentences 1-19, the contacting step may be carried out for an exposure time pf about 1 minute to about 60 minutes or from 30 minutes to about 60 minutes.

21. In the method according to any one of sentences 1-20, the ratio of the volume of the carbon fiber to the reactor volume may be from about 0.1 to about 0.6.

22. In the method according to any one of sentences 1-21, the contacting step may be carried out at a pH of from about 5 to about 7.

23. In the method according to any one of sentences 1-22, the temperature of the exposing step may be from about 75° C. to about 125° C.

24. In the method according to any one of sentences 1-23, may further include a step of condensing the vapor phase at the end of the contacting step and prior to the exposing step to condense at least some liquid silane onto the surface of the carbon fiber and said exposing step crosslinks at least some of the silane groups covalently bound to the surface of the carbon fibers and at least some of the liquid silane condensed onto the surface of the carbon fiber.

25. In the method according to sentence 24, the condensing step may be carried out by equilibrating the vapor phase and the carbon fiber to a pressure above the vapor pressure of the silane.

26. In the method according to sentence 24, the condensing step may be carried out at a pressure of from about 0.5 to about 1.5 atmospheres.

27. In the method according to any one of sentences 1-26, a sufficient amount of silane may be present in the contacting step to provide a saturated vapor phase.

28. In the method according to any one of sentences 1-26, the amount of silane deposited may be controlled by carrying out the contacting step with a vapor phase that is less than saturated.

29. In another aspect, the present invention relates to a method of modifying a surface of carbon fiber having a functional moiety, said method including steps of:
 (a) contacting the surface of the carbon fiber with a vapor phase containing a solvent and a silane capable of covalent bonding to the functional moiety on the surface of the carbon fiber; wherein said contacting step is conducted in a sealed container under vacuum pressure from the vapor pressure of the silane to up to 50662.5 Pa for a sufficient time to covalently bond at least some of said silane to the functional moiety on the surface of the carbon fiber; and
 (b) exposing the carbon fiber produced in step (a) to a temperature of from about 25° C. to about 200° C. for a period of from about 1 minute to about 96 hours to crosslink at least some of the silane on the surface of the carbon fiber.

30. In another aspect, the present invention relates to surface modified carbon fiber produced by any one of the methods according to sentences 1-29.

31. The surface modified carbon fiber of sentence 30 may have an interfacial shear strength of an interface between the modified carbon fiber surface and a polymer matrix that is increased as compared to the interfacial shear strength of the surface of the same carbon fiber without silanization and the same polymer matrix.

32. The surface modified carbon fiber of sentence 31 may have an increase in interfacial shear strength of from about 1 MPa to about 100 MPa.

33. The surface modified carbon fiber of sentence 31 may have an increase in interfacial shear strength of from about 13 MPa to about 38 MPa.

34. The surface modified carbon fiber of sentence 31 may have an interfacial shear strength of an interface between the modified carbon fiber surface and the polymer matrix increased as compared to the interfacial shear strength of a surface of a carbon fiber having a silane modified surface obtained by silanization using a silane solution at a pressure of 101325 Pa and the same polymer matrix.

35. The surface modified carbon fiber of any one of sentences 30-34 may have 1 to 10 layers of silane groups on the surface of the carbon fiber.

36. The surface modified carbon fiber of any one of sentences 30-34 may have a monolayer of silane groups on the surface of the carbon fiber.

37. In another aspect, the present invention relates to a polymer composite including the surface modified carbon fiber of any one of sentences 30-36.

DETAILED DESCRIPTION

The invention is a technique capable of depositing silane coupling agents (silanes, oraganosilanes, functionalized silanes, functionalized organosilanes, coupling agents, etc.) onto discrete carbon fibers (non-continuous) using a batch process. The invention is valuable for applications such as: modifying chemical functionality of the carbon surface, improving wetting and adhesion properties of the carbon surface, etc. This is useful in the improvement of polymeric-carbon fiber composite performance, synthesis of novel carbon-based materials, providing reactive groups for carbon fiber modifications, etc.

The invention typically utilizes solvent-free silane to perform a vapor phase deposition. This is unusual because it is believed that solution based hydrolysis of the ether bonds on the silane molecule is required to successfully attach the silane to the substrate surface [9]. Typical solution methods utilize a solution of silane, a good solvent (usually chosen to allow for hydrolysis of the ether linkage), and acid to adjust the pH to optimal level (described as catalyzing the hydrolysis). These methods have been used frequently for silanization of carbon fibers [10][11] with great success, however these methods do not tend to be able to control the size of the deposited layer. One scenario in these methods is that a macroscale layer of silane is produced making the surface chemistry favorable but final adhesion properties suffer. Imagine that in a composite material there is a layer of glass between the fiber and the polymer. When there is only a monolayer, the adhesion and wetting is greatly increased, but as the layer gets thicker, the bond is more brittle, reversing the effects of good adhesion. Because solution based methods are not precisely controllable to provide only a dilute amount of silane to the surface, there is always a chance that multiple layers are deposited.

Figure 4:
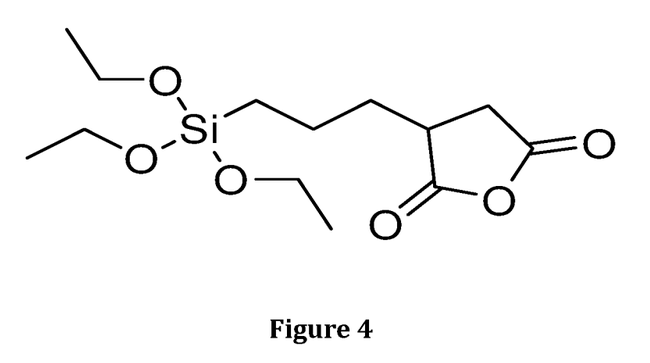
FIG. 4 shows the chemical structure of triethoxysilyl propylsuccinic anhydride (AnhPES).

In a preferred embodiment the present invention, the vapor phase is created without any additional components. Because the vapor pressure of silanes is typically low (<1 mmHg), it was not expected that vacuum deposition would provide enough silane to modify carbon fiber surfaces in bulk. The low vapor pressure was actually found to be an advantage because the dilute, dry silane vapor is able to ensure only a monolayer of silane is achieved on the surface. A similar method has been used previously for silicon, glass, and mica surfaces [12][13][14]. There are also some patents on silanization of carbon fibers [15], however this method requires providing special functional groups (e.g. isocyanate groups) on the carbon fiber surface prior to silanization. Other examples use evaporated silane solutions at ambient pressures with continuous evaporation used to carry silane and solvent to the substrate [16]. One difference of the present technique is silane application on carbon fibers in bulk without need for introducing special surface groups to the surface, as shown by FIG. 4.

One benefit of this method is that the vapor phase is able to not only provide a dilute vapor of silane for covalent bonding to the surface functional groups (which are either native or added by some previous processing step), but can also deposit droplets of silane liquid which condense or coalesce on the fiber surface. Because of the crosslinking step which is done after the vapor deposition, condensed droplets as well as covalently attached droplets are able to crosslink and become adhered to the surface of the fibers. This increases the overall mass of silane attached to each fiber, and crosslinking makes this layer more permanent. This produces enhanced properties of the final fiber.

Silanization using the present method increases the interfacial shear strength of the polymer-fiber interface. This is sometimes dependent on silane chemistry and amount deposited. More deposition of silane by methods such as prior art solvent application and solvent vapor phase treatments, leads to poor adhesion compared to the silane vapor deposition of the present invention.

Carbon nanotubes are far smaller dimensionally than carbon fibers. Carbon nanotubes consist of only a few layers (maximum) of carbon 'sheet'. This makes carbon nanotubes suitable for many applications where lightweight fillers are needed, but their strength is derived from their nanoscale, meaning they are not well-suited for commercial and large scale materials. Carbon nanotubes are also more commonly used for advanced chemical techniques because of their well-defined chemical structure. Carbon fibers can be chemically identical to carbon nanotubes, however "carbon fiber" refers generally to a carbon based material which is many layered and diameters on the orders of microns. Carbon fibers are lightweight and strong, thus their major application is as a filler for composites (polymers, ceramics). The major difference is that the chemical structure is not always clearly defined and is dependent on fabrication method, post-processing, and the chemical precursor used.

Some of the processing parameters that may be controlled in the contacting step of the present invention include the vacuum pressure, and exposure time. The vacuum pressure may range from a minimum of the vapor pressure of the silane being applied up to about 101325 Pa (1 atmosphere). The vacuum pressure can be used to control the concentration of silane in the vapor phase. The exposure time may be used to control the amount of deposited/reacted silane. Suitable exposure times may range from one minute up to, or exceeding 96 hours, preferably 1-24 hours.

Post processing may also impact the modified carbon fiber surface. Many silanization procedures simply deposit silane on the surface of the substrate. However, post-processing the silanized carbon fiber by heating the sample to temperatures above 100° C. drives water or other reaction products off and subsequently increases the reactivity of the remaining side groups leading to crosslinking [9]. During crosslinking silane molecules in close proximity (as would be found in dense deposits such as droplets) react with each other creating long, surface bound chains. These are more chemically stable and more effective for adhesion. The additional benefit of the present invention is that any covalently attached silane can be augmented by surrounding deposited silane molecules that are unbound regardless of prior surface functional group density. This leads to more silane deposits on the surface and higher functionality and adhesion in the final fiber.

Other processes have been used to apply silane to the surface of carbon fibers, including the process shown in reference [15] however the process described in this reference is specific to surface functional groups reacting with isocyanates and then with silanes. Additionally, our main goal is increasing the adhesion/wettability of the fibers, specifically the interfacial shear strength (IFSS) of the final composites. This patent [15] mentions reaction with the resin, implying improved adhesion, however the present inventive process likely only physically interacts with the polymer which increases the adhesion in a different way.

The present technique utilizes liquid silane coupling agent. Silanes as used herein refer to chemical compositing consisting of one or silicon atoms lined to each other or one or multiple atoms of other chemical elements as the tetrahedral centers of multiple single bonds. Typical silane coupling agents consist of at least one Si atom and one Si—O—R group which is hydrolysable to react with, for example, surface hydroxy and/or carboxy groups. The invention uses controlled vacuum pressure and, optionally, temperature to vaporize a silane coupling agent which subsequently reacts with, for example, hydroxy and/or carboxy surface groups binding covalently to the carbon fiber surface. Vapor phase deposition can apply selective amounts (down to monolayer) of coupling agent depending on process parameters. The invention is applicable to various geometries/loadings of carbon fiber. This invention is thus scalable to treat large amounts of carbon fibers in a batch process.

Processing Technique

Figure 3:
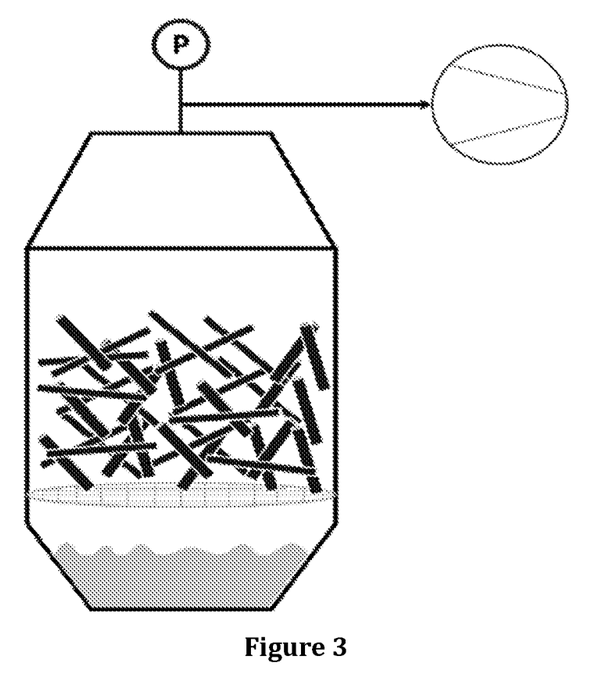
FIG. 3 shows a schematic of the vapor phase deposition process.

The present invention provides a processing technique for tuning the surface chemistry of carbon fibers using the application of silanes. In this technique, outlined in FIG. 3, chopped fibers are suspended over pure liquid silane and enclosed in a sealed vessel. Vacuum is applied to the chamber until an equilibrium pressure is achieved. During the pump down, silane evaporates. In the vapor phase, silane has two options: to interact with functional groups on the fiber surface or coalesce onto the surface as droplets. The chamber remains under vacuum for a given period of time until it is opened to the atmosphere for equilibration. During equilibration, some additional amount of silane condenses on the fiber surface.

After vacuum processing, fibers are heated to increase the rate of surface reactions and to crosslink the silane molecules. This accomplishes two things: it builds the average number of silane molecules attached to a single surface site and solidifies unreacted silane droplets, forming an adherent layer on the surface. The resulting carbon surface contains both chemically linked and adsorbed silane molecules in both crosslinked layers and as single molecules, as depicted in FIG. 1. This method expands upon previous methods with the advantages of: (i) having only a dilute amount of silane available (achieved by not using solvent) such that the fiber surface can only achieve monolayers, (ii) having a technique wherein the neat surface geometry and chemistry are not important, and (iii) allowing for silane deposition regardless of covalent bonds to the surface. This leads to silanization of the fibers which increases the surface concentration without saturation, leading to more effective modification of the surface chemistry.

This process has high potential for scalability to industrially relevant processes. There are no requirements as to the material quantities, other than that excess liquid silane be used for full silanization. This can be varied to control the surface saturation by many means. Since the vapor phase is able to penetrate complex geometries quickly, silanization of bulk chopped fibers can be achieved in large scales.

Demonstration of Application

To demonstrate the technique triethoxysilyl propylsuccinic anhydride (AnhPES), obtained from Gelest Inc. was deposited onto the surface of petroleum pitch-based carbon fiber (PITCH fibers). The chemical structure of the silane is shown in FIG. 4.

Prior to silanization, fiber surfaces were oxidized in the bulk in an ozone reactor. Further details of this procedure are given in another work [8]. The oxidized surface was chosen to enhance the attachment of silane due to increased surface oxygen containing moieties. Both chopped (5 mm) and long tows (12.7 cm) of fibers were treated using identical methods to be used in different characterization techniques and to assess process variability. Silane was applied using the technique above, where fibers were exposed to silane vapor for 1 hr at pressures below 0.1 torr and crosslinked at 100° C. for at least 24 hr.

Surface Analysis

The modified carbon fiber surface was analyzed using (EDS) performed on a Zeiss scanning electron microscope (SEM). This technique gives a good measure of the presence of silane molecules on the fiber surface via atomic composition and a map of the elements present. These maps are used to demonstrate uniformity of the silane deposition across the surface of a single fiber. More quantitative analysis is performed using a Phi Versaprobe X-ray photoelectron spectrometer (XPS).

Contact angle was measured using a Cahn Dynamic Contact Angle Analyzer (DCA-332). Single fibers were immersed in water up to 1 mm during which an average advancing angle is recorded. The fiber is withdrawn and an average receding contact angle recorded. Measurements were done on 5 individual fibers sampled from the same batch. The individual contact angles are averaged to determine characteristic dynamic contact angles. Interfacial shear strength (IFSS) was determined using single fiber fragmentation (SFF) testing. Fiber samples were produced using molten polyetherimide (PEI) and single long carbon fibers. These results were averaged over multiple fiber composites, with additional details given in reference [8].

Figure 5A:
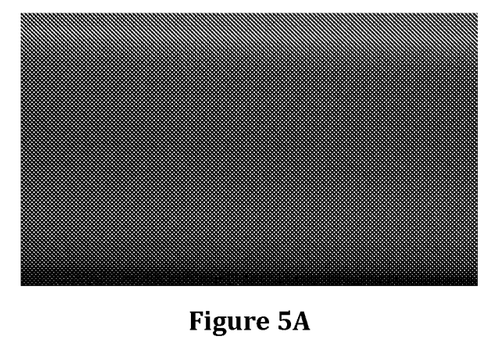
FIG. 5A shows a scanning electron microscopy (SEM) micrograph of the oxidized fiber surface before treatment with AnhPES.
Figure 5B:
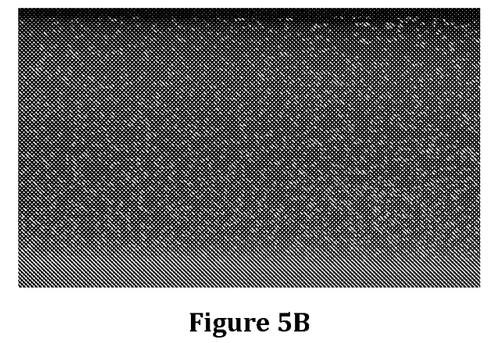
FIG. 5B shows energy-dispersive spectroscopy (EDS) element maps of the oxidized fiber surface before treatment with AnhPES. The dots indicate elemental oxygen. The fiber diameter is 5 μm.
Figure 5C:
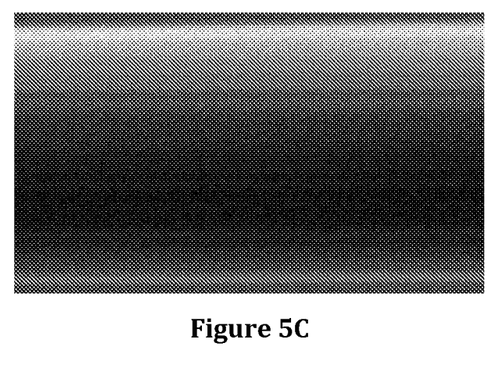
FIG. 5C shows SEM micrograph of the silanized fiber surface after treatment with AnhPES. The fiber diameter is 5 μm.
Figure 5D:
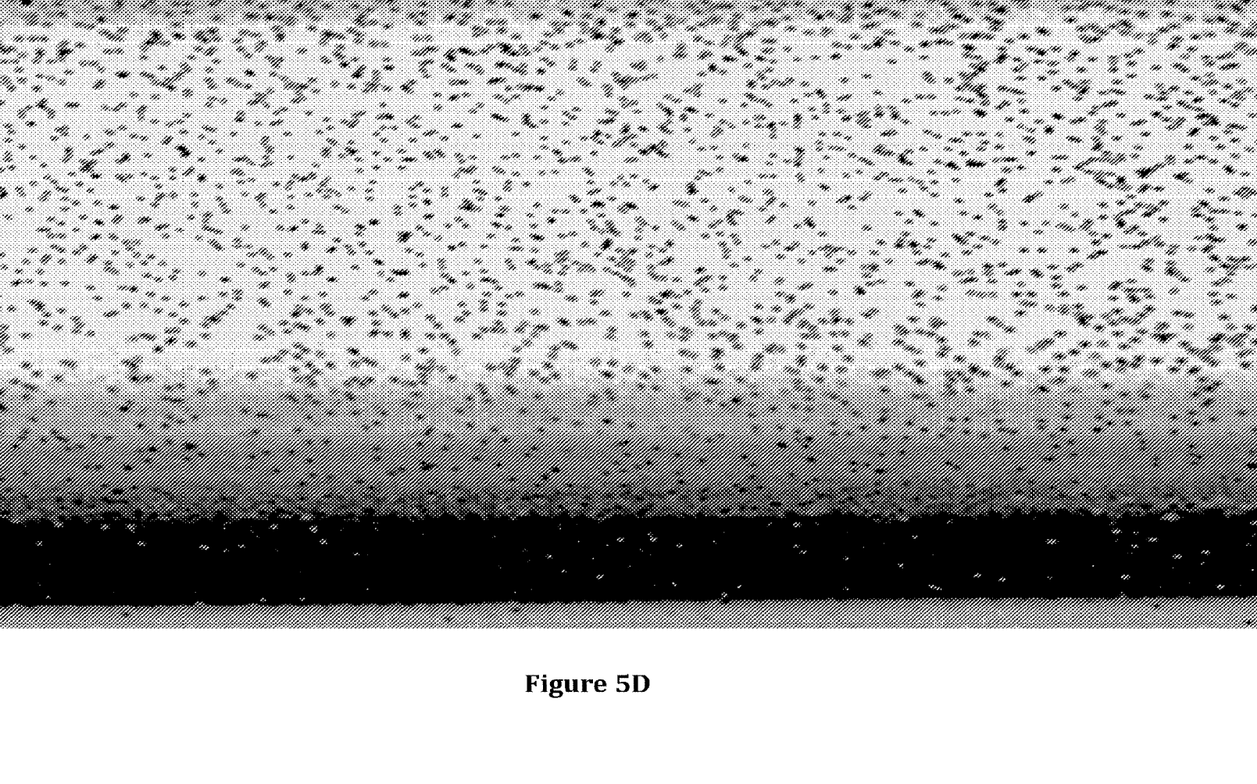
FIG. 5D shows EDS elemental maps of the silanized fiber surface after treatment with AnhPES. The colors of the EDS elemental map have been inverted to aid in visualizing the different shades of the dots. The dark dots and light dots indicate elemental oxygen and silicon, respectively. The fiber diameter is 5 μm.

Results After treatment, single chopped fibers were characterized using SEM/EDS. The SEM micrograph in FIG. 5A shows an oxidized fiber surface. As shown by FIG. 5C, the silanized fiber surface shows no observable physical change over the oxidized fiber. This confirms the thickness of the coating is minute, meaning there are no macroscale deposits and adhesion potential is optimal for composite manufacture. The element maps in FIG. 5B show an even distribution of oxygen sites due to the oxidation treatment. After silane treating, the fiber contains an even distribution of silicon atoms that correspond to only a fraction of the original oxygen atoms. Additional oxygen from the silane molecule is also present. These results from EDS should be interpreted to show a generally favorable uniformity, however no direct observation of the silane molecule can be made and quantitative measures are not made.

Figure 6:
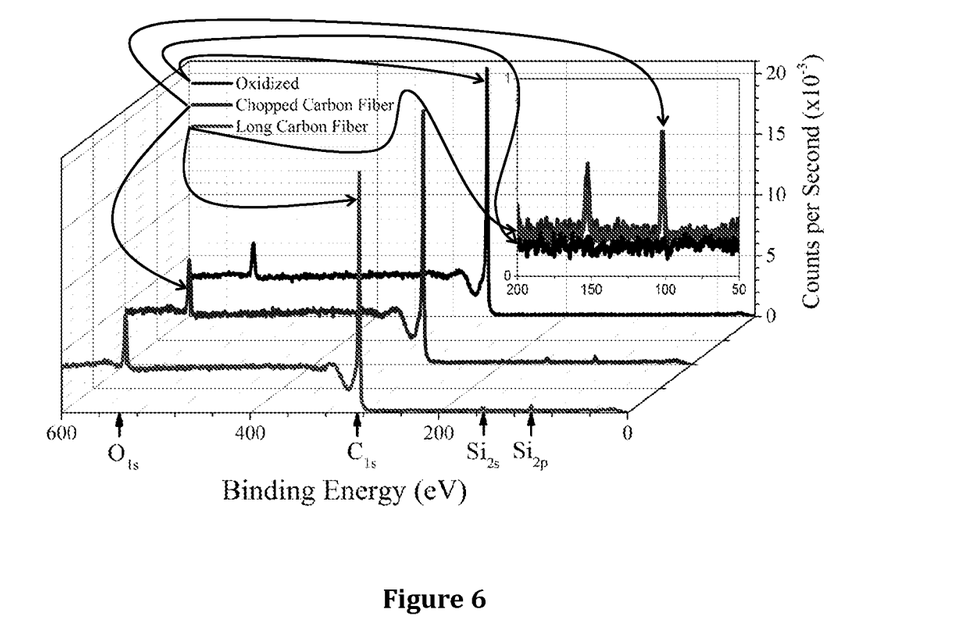
FIG. 6 shows X-ray photoelectron spectroscopy (XPS) spectra for oxidized and treated carbon fibers. The inset shows peaks corresponding to surface silicon. Only a select range of binding energies is shown.

Quantitative surface analysis was performed using X-ray photoelectron spectroscopy (XPS). Contrary to EDS, XPS is highly surface specific, probing about 5 nm depth of the sample surface. Additionally, the X-ray beam covers a spot size of diameter 200 μm, meaning the measurement averages over approximately 40 fibers. FIG. 6 shows the XPS spectra measured for oxidized fibers and both long and short batches of AnhPES treated fibers. The oxidized fibers show only carbon and oxygen present on the surface. This is expected, as the oxidation increases the oxygen content of the neat carbon surface. The magnitude of the peak corresponding to $0_{1s}$ is slightly increased for the treated samples corresponding to the oxygen from the silane molecule. Note that this value is not predictable because it depends on the number of chemically bound silane molecules and crosslinked molecules which individually alter the number of oxygens present in the silane layer. Additionally, the inset shows clearly the existence of a $Si_{2s}$ and $Si_{2p}$ peak in only the treated samples, confirming successful application of silane to the fiber surfaces.

Figure 7:
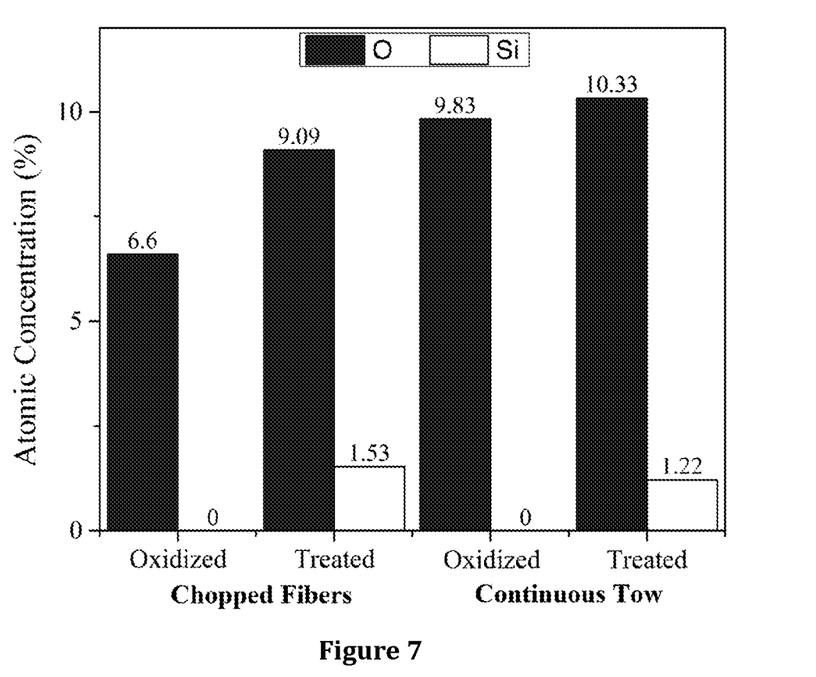
FIG. 7 shows XPS atomic concentrations for oxygen and silicon on oxidized and treated silanized fibers.

The atomic concentrations measured from the XPS spectra are summarized in FIG. 7. This confirms the absence of Si in the oxidized samples, which is increased to just greater than 1% for both treated samples. The chopped fibers show a marked increase in the concentration of oxygen (>2%) from oxidized to treated, corresponding to the oxygen containing moieties of the silane molecule. Interestingly this increase is less pronounced for the continuous tow fibers. There is a noticeable difference in the oxygen content of the oxidized fibers suggesting increased number of binding sites for the silane molecules on the continuous tow, however approximately the same is deposited as determined by the silicon content. This suggests that either there is a fixed number of accessible sites (hydroxyls) on the fiber surface or that the process is limited by some other factor.

Figure 8A:
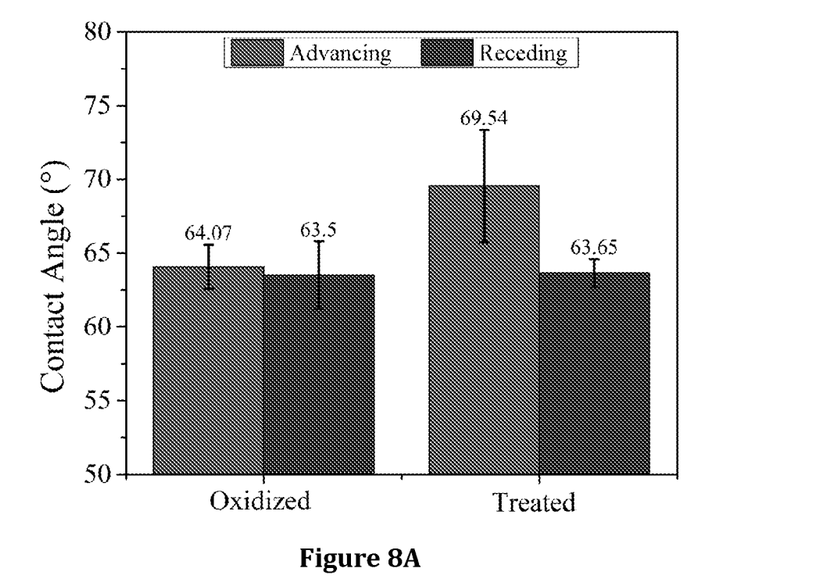
FIG. 8A shows a comparison the water contact angle for the oxidized versus the AnhPES treated fibers. The error bars represent 95% confidence intervals on the mean.

After confirmation of the existence of silane molecules on the fiber surface, the change in bulk fiber properties due to silanization was demonstrated. Contact angle is typically used as an indirect measure of surface chemistry. It is also a critical property in determining the resin compatibility of the fibers. FIG. 8A shows the water dynamic contact angles for oxidized and AnhPES treated fibers. The oxidized fiber surface is moderately hydrophilic, due to the hydroxyl groups on the surface. The advancing and receding angles are separated by less than 0.5°. This suggests a highly heterogeneous surface with defects (functional groups in this case) of very small, uniform length scales. For the silanized fibers there is a slight increase in the advancing water contact angle. Additionally, there is higher variability in the advancing contact angle. The receding contact angle for the silanized fiber is identical to the oxidized surface. These results suggest that the surface has become more heterogeneous, with increased length scale of surface features (i.e. pendant silane molecules). This shows that the silane layer is not a homogenous coating, but rather a randomly dispersed set of molecules. Overall the surface has become slightly more hydrophobic due to the hydrophobic moieties of the silane molecule. This is favorable for hydrophobic resins used in the ultimate composite, as wetting and subsequent adhesion will be increased between the matrix and the filler.

Figure 8B:
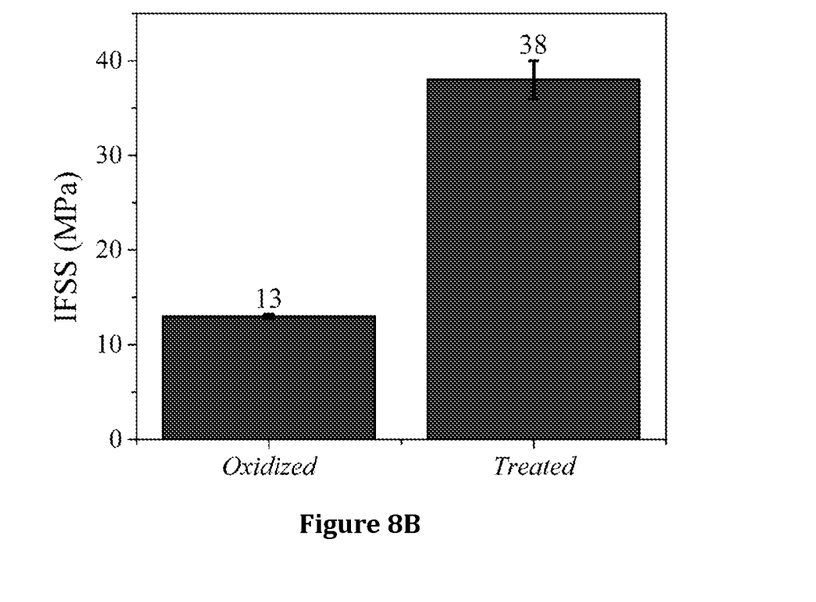
FIG. 8B shows a comparison of Interfacial shear strength (IFSS) for the oxidized versus the AnhPES treated fibers. The error bars are reported as standard deviations.

To quantify the adhesion of the silanized fiber in the ultimate composite, interfacial shear strength (IFSS) is measured for the fibers embedded in a polyetherimide, thermoplastic resin. The resulting IFSS values for the oxidized and silanized fibers are shown in FIG. 8B. As shown, the IFSS is consistently increased by 25 MPa after silanization over the neat oxidized fibers. This shows that adhesion between the matrix and the fiber surface is greatly increased by silanization and the ultimate composite strength is significantly improved. The increased adhesion is likely due to a combination of increased hydrophobicity of the surface, and chemical groups which are able to physically and chemically interact with the polymer matrix, increasing the strength of the interface.

Coupling Agent Chemistry

Table 1 shows example chemistries of coupling agents used in this work. The coupling agent must contain at least one hydrolysable alkoxy group attached to a Si atom (R—O—Si) which is also attached to an organic functionality (Si—R').

all of the tested silanes. Integration of Si and increases in O content on the fiber surface improves interfacial performance for a number of applications.

Figure 10:
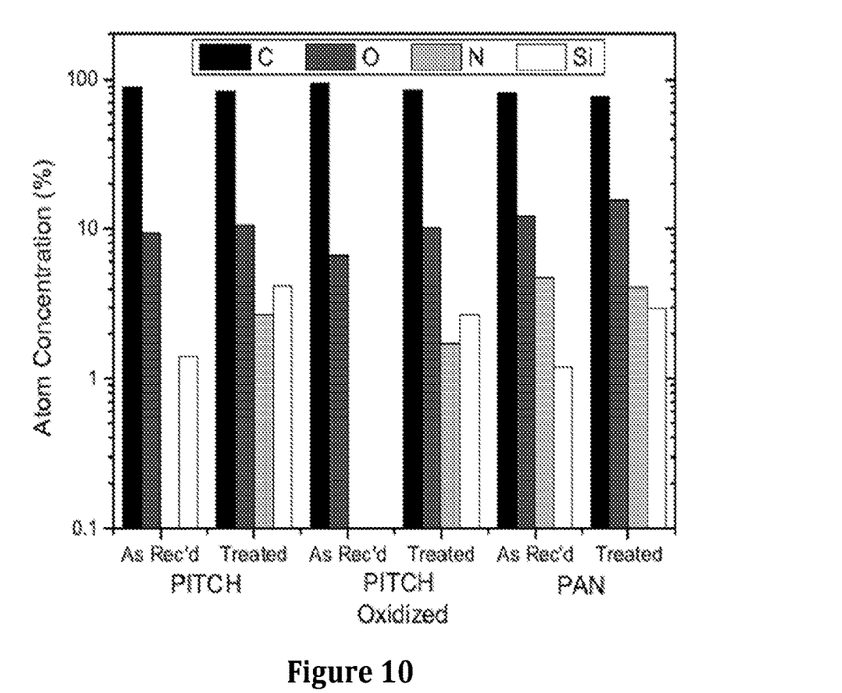
FIG. 10 shows the atomic composition of carbon fiber surfaces of varying carbon fiber type (using APES) chemistry.
Figure 11A:
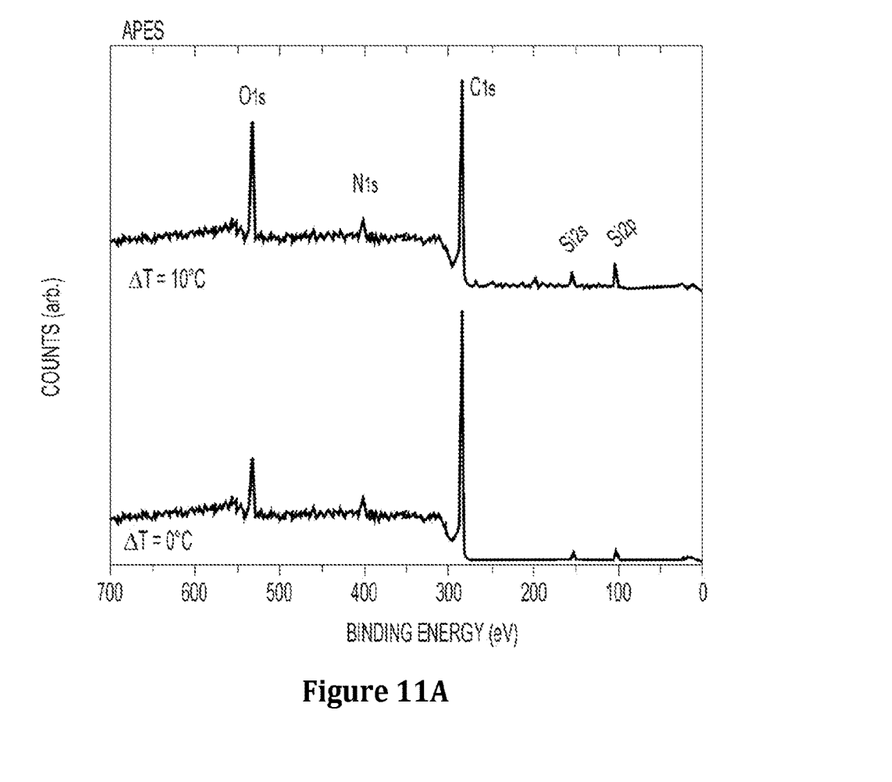
FIG. 11A shows a typical XPS spectra of carbon fiber surface characterization for varying process temperatures (using APES chemistry)
Figure 11B:
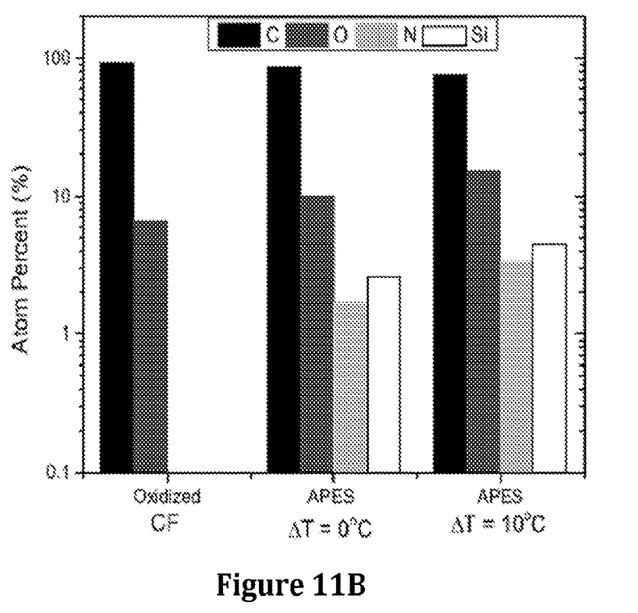
FIG. 11B shows the atomic composition of carbon fiber surface characterization for varying process temperature (using APES chemistry)
Figure 12A:
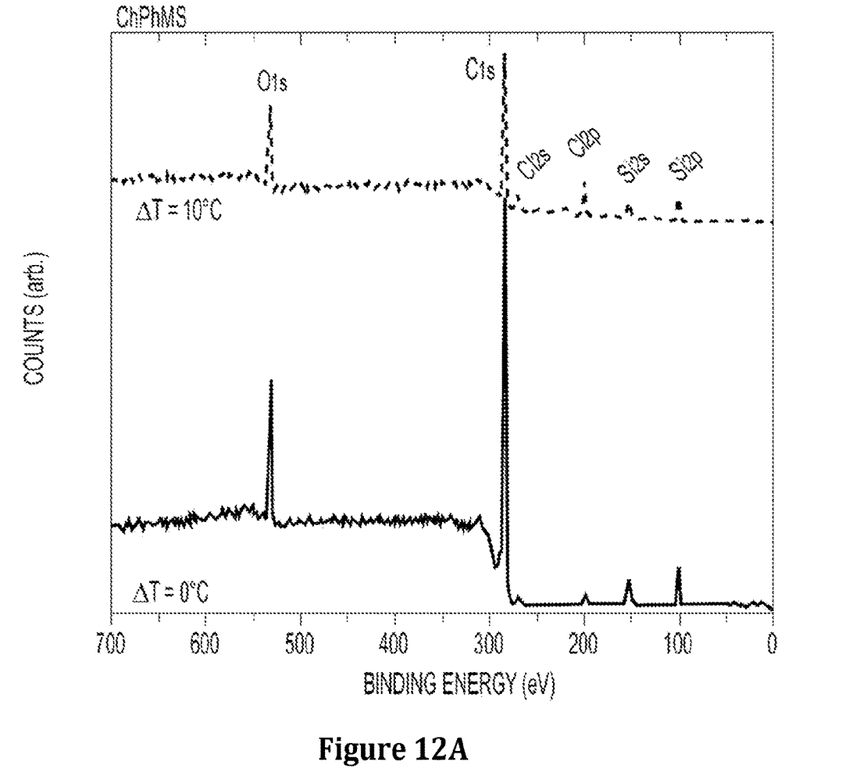
FIG. 12A shows a typical XPS spectra of carbon fiber surface characterization for varying process temperatures (using Ch-PhMS chemistry)
Figure 12B:
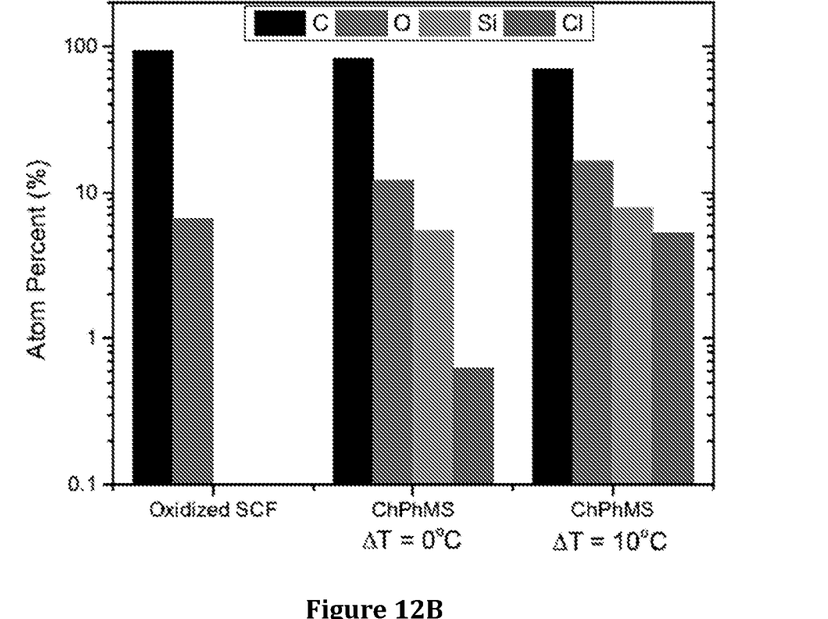
FIG. 12B shows the atomic composition of carbon fiber surface characterization for varying process temperature using chloromethyl phenylethyl trimethoxysilane (Ch-PhMS) chemistry.

FIG. 10 shows XPS determined atomic concentrations for three common types of short carbon fibers. The invention successfully changes surface functionality in all cases regardless of fiber type (and pre-treatments such as oxidation, plasma cleaning, etc.) as shown by an increase in Si and O content and for PITCH fibers the presence of N for an amine bearing coupling agent.

Temperature is one process variable available to tune the amount of coupling agent introduced to the fiber surface. FIGS. 11A-11B and 12A-12B show, for two different silanes, that increasing the silane temperature with respect to ambient temperature increases the amount of coupling agent deposited.

Figure 13:
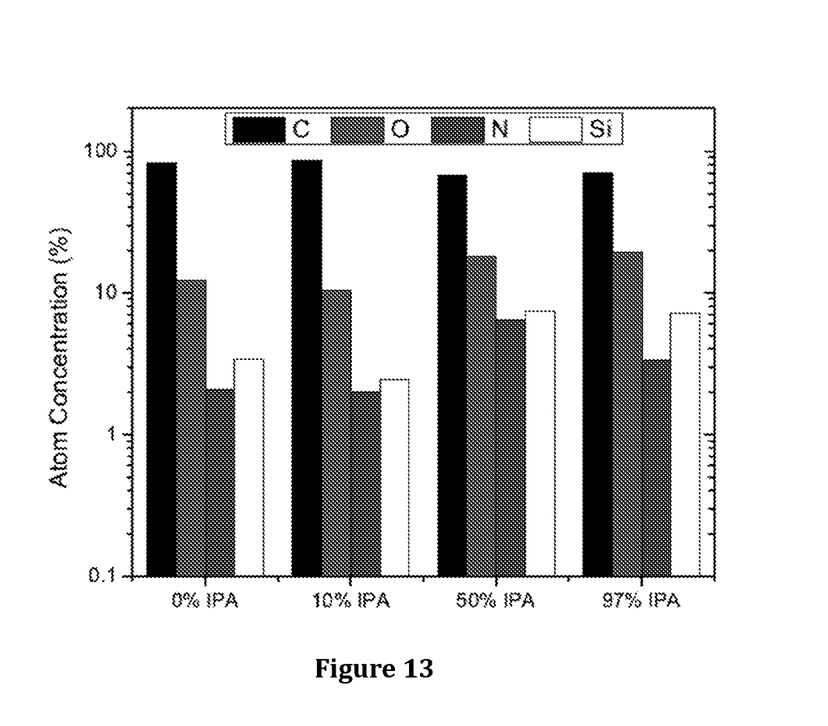
FIG. 13 shows a chart of the carbon fiber surface characterization for varying co-solvent (IPA) concentration (using APES chemistry)

The addition of some solvent can be used to alter the vapor pressure of the silane, as necessary. As FIG. 13 shows, increasing the amount of volatile solvent when the alteration of vapor pressure of the silane is desirable increases the amount of deposited coupling agent.

This invention provides a novel technique for applying highly tailored surface functionality to the surface of chopped carbon fibers. Unlike convention methods, this

TABLE 1

Coupling Agents

| Coupling Agent | Abbreviation | Structure |
| --- | --- | --- |
| (3-Aminopropyl) trimethoxysilane | APMS | |
| (3-Aminopropyl) triethoxysilane | APES | |
| (3-Acryloxypropyl) trimethoxysilane | AcPMS | |
| (3-Triethoxysilyl) propyl succinic anhydride | AnhPMS | |
| ((Chloromethyl) phenylethyl trimethoxy silane | ChPhMS | |

Figure 9A:
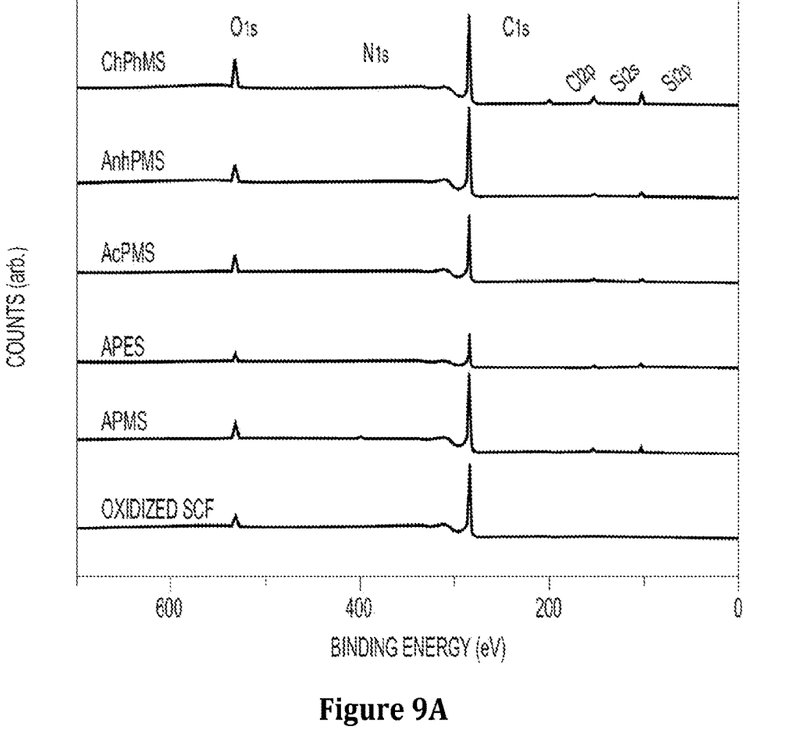
FIG. 9A shows XPS spectra of oxidized PITCH fibers for 3-aminopropyltriethoxysilane (APES), 3-acryloxypropyl trimethoxysilane (AcPMS), 3-aminopropyltrimethoxysilane (APMS), triethoxysilopropylsuccinicanhydride (AnhPMS), and chloromethyl phenylethyl trimethoxysilane (Ch-PhMS).
Figure 9B:
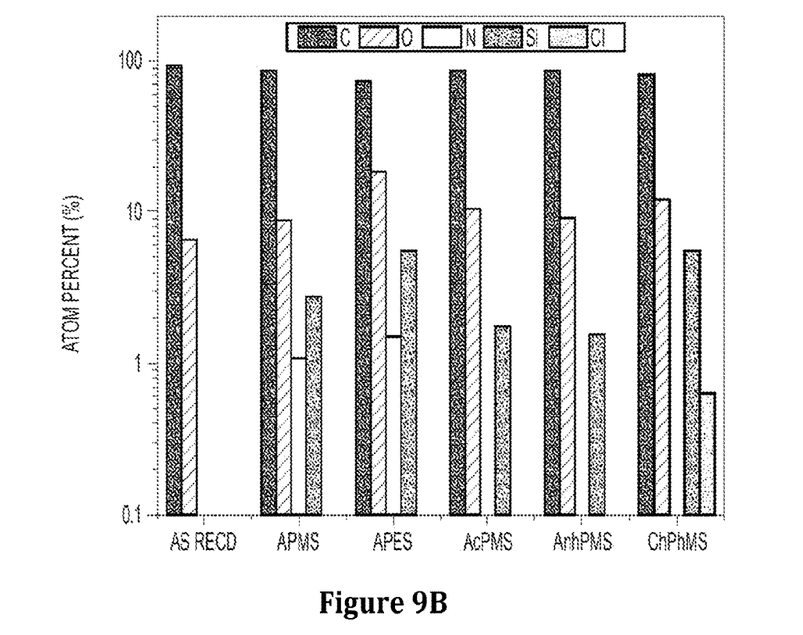
FIG. 9B shows atomic compositions for various coupling agent chemistries.

The vapor phase treatment was successfully applied using various silanes where the process employed pure coupling agent (solvent-free). The XPS spectra shown in FIG. 9A illustrates successful surface chemistry modification of oxidized PITCH fibers. As the comparison in FIG. 9B shows, the invention is able to apply surface functionality via attachment of silane (i.e. Si) to the carbon fiber surface for technique uses pure silane in a vapor phase deposition. This minimizes the concentration of silane exposed to the surface leading to very small scale layers of silane. Silane molecules are physically or chemically attached to the surface and crosslinked allowing for higher amount of silane spread across the surface and eliminating the need for highly functional precursor surfaces.

Using a model case, the proposed technique demonstrated using triethoxysilyl propylsuccinic anhydride deposited onto the surface of oxidized pitch based chopped carbon fiber. EDS and XPS results showed randomly distributed silane molecules are deposited repeatably with a surface concentration of >1%. Overall water contact angle showed that the silane increases the hydrophobicity of the fiber surface by heterogeneous function groups which increase the dimension of surface defects, meaning hysteresis is also increased. The resulting silanized fibers show an increased interfacial shear strength of over 25 MPa in thermoplastic polyimide, meaning silanized composites show drastically higher performance. Depending on the application, specific functional groups can be selected from known silane chemistries. The process outlined above may be used to produce fiber surfaces with these chemistries, subject to optimized process conditions. Using this process, large quantities of chopped fibers are able to be treated repeatably and uniformly.

REFERENCES

The following references may be useful in understanding some of the principles discussed herein:
1. Biron, Michel. *Thermoplastics and Thermoplastic Composites*. Waltham, MA: William Andrew, 2013.
2. Beland, Sylvie. *High Performance Thermoplastic Resins and their Composites*. Park Ridge, NJ: Noyes Data Corp., 1991.
3. Park, Soo-Jin & Seo, Min-Kang. *Interface Science and Composites*. Waltham, MA: Academic Press, 2011.
4. Plueddemann, Edwin P. *Silane Coupling Agents*, $2^{nd}$ Ed. New York, NY: Springer Science-Business Media, 1991.
5. Jiang, S., Li, Q., Zhao, Y., Wang, J. & Kang, M. "Effect of surface silanization of carbon fiber on mechanical properties of carbon fiber reinforced polyurethane composites." *Composites Science and Technology* 110 (2015): 87-94. http://dx.doi.org/10.1016/j.compscitech.2015.01.022
6. Xu, Yunsheng & Chung, D. D. L. "Silane-treated carbon fiber for reinforcing cement." *Carbon* 39 (2001): 1995-2001. https://doi.org/10.1016/S0008-6223(01)00028-8
7. Zhang, F., Sauter, K., Larsen, A. M., Findley, D. A., Davis, R. C., Samha, H., & Linford, M. R. "Chemical Vapor Deposition of Three Aminosilanes on Silicon Dioxide: Surface Characterization, Stability, Effects of Silane Concentration, and Cyanine Dye Adsorption." *Langmuir* 26 (2010): 14648-14654. https://doi.org./10.1021/La102447y
8. Deitzel, J. M., Kubota, M., Alvarez, N., Palmese, G., Bortner, M., & Riffle, J. "Surface Treatment of TuFF Pitch Carbon Fiber for Adhesion Promotion in High $T_g$ Thermoplastic Composites". *SAMPE Technical Conference Proceedings*. Charlotte, NC, May 20-23, 2019. Society for the Advancement of Material and Process Engineering. (in press)
9. Plueddemann, Edwin P. "Silane Coupling Agents," 2nd Ed. New York, NY: *Springer Science-Business Media*, 1991.
10. Jiang, S., Li, Q., Zhao, Y., Wang, J. & Kang, M. "Effect of surface silanization of carbon fiber on mechanical properties of carbon fiber reinforced polyurethane composites." *Composites Science and Technology* 110 (2015): 87-94. http://dx.doi.org/10.1016/j.compscitech.2015.01.022
11. Xu, Yunsheng & Chung, D. D. L. "Silane-treated carbon fiber for reinforcing cement." *Carbon* 39 (2001): 1995-2001. https://doi.org/10.1016/S0008-6223(01)00028-8
12. Lyubchencko, Y. et al. "Atomic Force Microscopy Imaging of Double Stranded DNA and RNA." J Biomol. Struc. Dynam. 10(1992): 589-606. https://doi.org/10.1080/07391102.1992.10508670
13. Anderson, A. S. et al. "Functional PEG-Modified Thin Films for Biological Detection." *Langmuir.* 24(2008): 2240-2247. https://doi.org/10.1021/Ia7033438
14. Zhang, F., Sauter, K., Larsen, A. M., Findley, D. A., Davis, R. C., Samha, H., & Linford, M. R. "Chemical Vapor Deposition of Three Aminosilanes on Silicon Dioxide: Surface Characterization, Stability, Effects of Silane Concentration, and Cyanine Dye Adsorption." *Langmuir* 26 (2010): 14648-14654. https://doi.org/10.1021/Ia102447y
15. Huang, Xiaosong. "Methods of treating carbon fibers, fiber-reinforced resins, and methods of making the fiber-reinforced resins." U.S. Pat. No. 8,309,644 B1. (2012).
16. Duesberg, G., Liebau, M., Unger, E. "Silanized carbon nanotubes and method for the production thereof." U.S. Pat. No. 7,731,928 B2. (2010).

What is claimed is:
1. A method of modifying a surface of carbon fiber having a functional moiety, said method comprising steps of:
 (a) contacting in a reactor, in the absence of a solvent, the surface of the carbon fiber with a vapor phase of a silane capable of covalent bonding to the functional moiety on the surface of the carbon fiber or depositing via condensation on the surface of the carbon fiber; wherein said contacting step is conducted in a sealed container under a vacuum pressure ranging from the vapor pressure of the silane to up to about 101325 Pa for a sufficient time to covalently bond at least some of said silane to the functional moiety on the surface of the carbon fiber; and
 (b) exposing the carbon fiber produced in step (a) to a temperature of from about 25° C. to about 200° C. for a period of from about 1 minute to about 96 hours to crosslink at least some of the silane on the surface of the carbon fiber; wherein
 i) the carbon fiber and the reactor each have a volume and a ratio of the volume of the carbon fiber to the reactor volume is from about 0.1 to about 0.6, the contacting step is carried out at a pH of from about 5 to about 7 and the temperature of the exposing step is from about 75° C. to about 125° C., or
 ii) further comprising a step of condensing the vapor phase at the end of the contacting step and prior to the exposing step by equilibrating the vapor phase and the carbon fiber to a pressure above the vapor pressure of the silane to condense at least some liquid silane onto the surface of the carbon fiber and said exposing step crosslinks at least some of the silane groups covalently bound to the surface of the carbon fibers and at least some of the liquid silane condensed onto the surface of the carbon fiber.
2. The method of claim 1, wherein the functional moiety on the surface of the carbon fiber comprises one or more hydroxyl groups, one or more carboxyl groups, a combination of hydroxyl groups and carboxyl groups or a combination of hydroxyl groups, carboxyl groups and amine groups.
3. The method of claim 1, wherein the functional moiety on the surface of the carbon fiber is formed by one or more of the following methods, ozone treatment, plasma, treatment with an acid, hydride chemistry, treatment with a base, thermal oxidation, and gamma radiation.

4. The method of claim 1, wherein the carbon fiber has an average length of from about 1 mm to about 100 mm and an average fiber diameter of from about 1 µm to about 100 µm.

5. The method of claim 1, wherein the carbon fiber is chopped carbon fiber.

6. The method of claim 1, wherein the silane is an organosilane or a functionalized organosilane selected from the group consisting of acrylate and methacrylate functional silanes, aldehyde functional silanes, amino functional silanes, anhydride functional silanes, azide functional silanes, carboxylate functional silanes, phosphonate functional silanes, sulfonate functional silanes, epoxy functional silanes, ester functional silanes, halogen functional silanes, hydroxyl functional silanes, isocyanate and masked isocyanate functional silanes, phosphine and phosphate functional silanes, sulfur functional silanes, vinyl and olefin functional silanes, multi-functional and polymeric silanes, UV active and fluorescent silanes, chiral silanes, trihydrosilanes, and dipodal silanes.

7. The method of claim 1, wherein the silane is selected from the group consisting of (3-aminopropyl) trimethoxysilane, (3-aminopropyl) triethoxysilane, (3-acryloxypropyl) trimethoxysilane, (3-triethoxysilyl) propyl succinic anhydride, and ((chloromethyl) phenylethyl) trimethoxy silane.

8. The method of claim 1, wherein surface modification of the surface of the carbon fiber is controlled by controlling at least two of the following parameters, process temperature, vacuum pressure, humidity, exposure time, fiber/reactor volume ratio, pH, and crosslinking temperature.

9. The method of claim 1, wherein the vacuum pressure is from about $10^{-3}$ mmHg to about 200 mmHg.

10. The method of claim 1, wherein the contacting step is carried out at a temperature of from about 0° C. to about 200° C.

11. The method of claim 1, wherein the contacting step is carried out at a relative humidity of from about 0% to about 10% for an exposure time of from 30 minutes to 60 minutes.

12. The method of claim 1, wherein the ratio of the volume of the carbon fiber to the reactor volume is from about 0.1 to about 0.6, the contacting step is carried out at the pH of from about 5 to about 7 and the temperature of the exposing step is from about 75° C. to about 125° C.

13. The method of claim 1, comprising the step of condensing the vapor phase at the end of the contacting step and prior to the exposing step by equilibrating the vapor phase and the carbon fiber to the pressure above the vapor pressure of the silane to condense at least some liquid silane onto the surface of the carbon fiber and said exposing step crosslinks at least some of the silane groups covalently bound to the surface of the carbon fibers and at least some of the liquid silane condensed onto the surface of the carbon fiber.

14. The method of claim 1, wherein a sufficient amount of silane is present in the contacting step to provide a saturated vapor phase.

15. The method of claim 1, wherein the amount of silane deposited is controlled by carrying out the contacting step with a vapor phase that is less than saturated.

* * * * *